(12) United States Patent
Beach et al.

(10) Patent No.: US 6,937,636 B1
(45) Date of Patent: Aug. 30, 2005

(54) TAPERED LASER RODS AS A MEANS OF MINIMIZING THE PATH LENGTH OF TRAPPED BARREL MODE RAYS

(75) Inventors: Raymond J. Beach, Livermore, CA (US); Eric C. Honea, Sunol, CA (US); Stephen A. Payne, Castro Valley, CA (US); Ian Mercer, London (GB); Michael D. Perry, Poway, CA (US)

(73) Assignee: The Regents of the University of California, Oakland, CA (US)

(*) Notice: Subject to any disclaimer, the term of this patent is extended or adjusted under 35 U.S.C. 154(b) by 77 days.

(21) Appl. No.: 09/651,658

(22) Filed: Aug. 29, 2000

Related U.S. Application Data

(60) Provisional application No. 60/156,279, filed on Sep. 27, 1999.

(51) Int. Cl.$^7$ ............................................. H01S 3/06
(52) U.S. Cl. ........................... 372/66; 372/71; 372/72; 372/101
(58) Field of Search .............................. 372/66, 71, 69, 372/101, 72; 385/31

(56) References Cited

U.S. PATENT DOCUMENTS

| | | | | |
|---|---|---|---|---|
| 3,617,917 A | * | 11/1971 | Uchida | 372/66 |
| 4,521,070 A | * | 6/1985 | Sottini et al. | 385/31 |
| 5,307,430 A | | 4/1994 | Beach | 385/31 |
| 5,508,842 A | * | 4/1996 | Takeda et al. | 372/66 |
| 5,859,868 A | * | 1/1999 | Kyusho et al. | 372/71 |
| 5,936,984 A | * | 8/1999 | Meissner et al. | 372/69 |
| 6,160,934 A | * | 12/2000 | Beach et al. | 385/31 |

OTHER PUBLICATIONS

R.J. Beach et al, "High-Average-Power Diode-Pumped Yb:YAG Lasers," UCRL-JC-133848.
Eric C. Honea et al "183-W, $M^2$=2.4 Yb:YAG Q -switched laser," Optics Letters/vol. 24, No 3/Feb. 1, 1999 pp. 154-156.
Camille Bibeau et al "High-Average-Power 1-$\mu$m Performance and Frequency Conversion of a Diode-End-Pumped Yb: YAG Laser," IEEE Journal of Quantum Electronics, vol. 34, No. 10. Oct. 1998 pp. 2010-2019.

* cited by examiner

*Primary Examiner*—Minsun Oh Harvey
*Assistant Examiner*—Cornelius H Jackson
(74) *Attorney, Agent, or Firm*—John P. Wooldridge; Alan H. Thompson

(57) ABSTRACT

By tapering the diameter of a flanged barrel laser rod over its length, the maximum trapped path length of a barrel mode can be dramatically reduced, thereby reducing the ability of the trapped spontaneous emission to negatively impact laser performance through amplified spontaneous emission (ASE). Laser rods with polished barrels and flanged end caps have found increasing application in diode array end-pumped laser systems. The polished barrel of the rod serves to confine diode array pump light within the rod. In systems utilizing an end-pumping geometry and such polished barrel laser rods, the pump light that is introduced into one or both ends of the laser rod, is ducted down the length of the rod via the total internal reflections (TIRs) that occur when the light strikes the rod's barrel. A disadvantage of using polished barrel laser rods is that such rods are very susceptible to barrel mode paths that can trap spontaneous emission over long path lengths. This trapped spontaneous emission can then be amplified through stimulated emission resulting in a situation where the stored energy available to the desired lasing mode is effectively depleted, which then negatively impacts the laser's performance, a result that is effectively reduced by introducing a taper onto the laser rod.

20 Claims, 3 Drawing Sheets

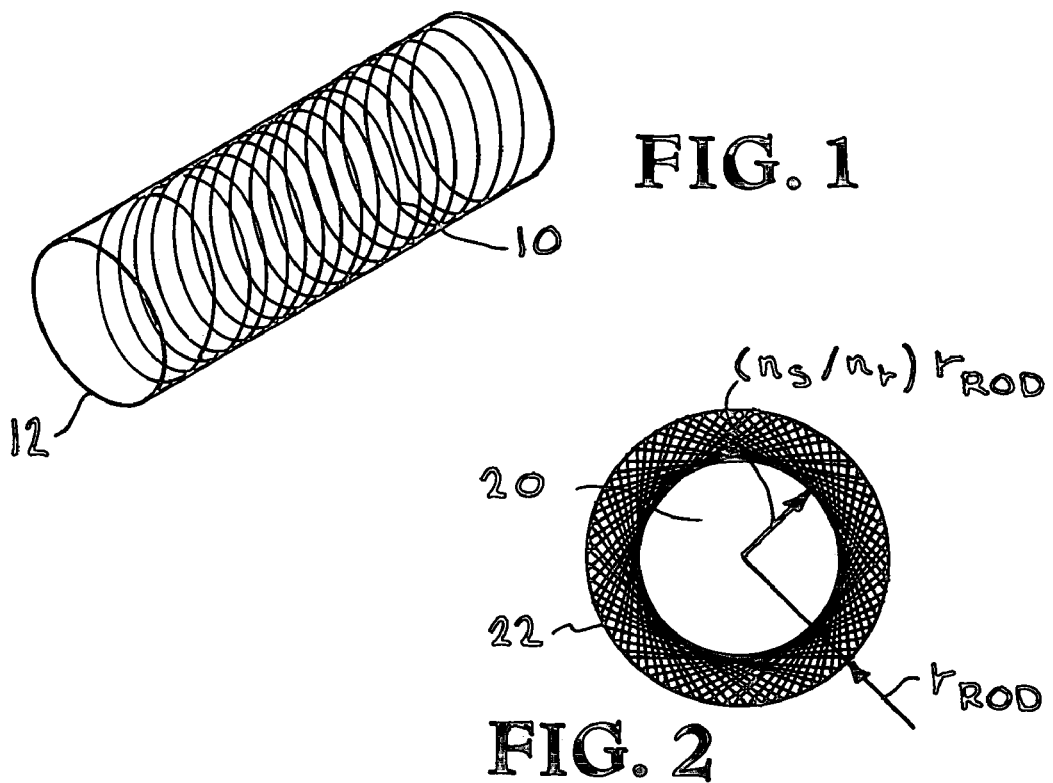
FIG. 1
FIG. 2
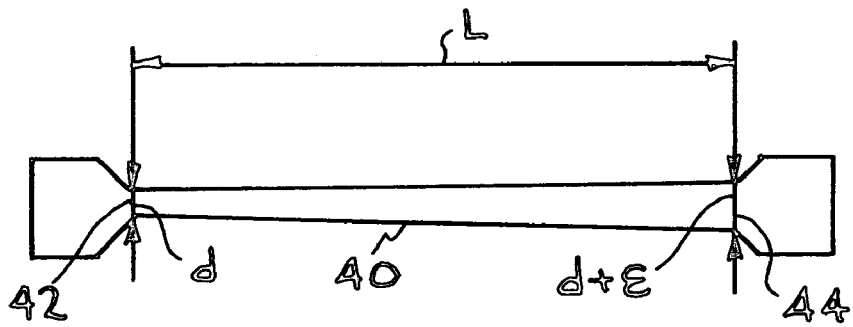
FIG. 4
FIG. 5
MAXIMUM PATH LENGTH = $2l\sqrt{1+\dfrac{2d}{\varepsilon}}$

TAPERED LASER RODS AS A MEANS OF MINIMIZING THE PATH LENGTH OF TRAPPED BARREL MODE RAYS This application claims priority to Provisional Patent Application Ser. No. 60/156,279, titled "Tapered Laser Rods as a Means of Minimizing the Path Length of Trapped Barrel Mode Rays," filed Sep. 27, 1999, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to means for improving laser performance through reduction of amplified spontaneous emission (ASE), and more particularly, it relates to the use of a flanged and tapered laser rod to limit the maximum ray paths that can be trapped within the laser rod.

2. Description of Related Art

As early as 1965, reports in the literature discuss the impact of trapped light in polished barrel laser rods (J. Linn and J. Free, "Effect of Trapped Light on the Output of a Ruby laser," Applied Optics, 4, p 1099, 1965). The established picture of trapped laser light 10 in a polished barrel laser rod 12 is shown in FIG. 1. Nearly all laser rods employed in laser systems today incorporate fine grind on the side surfaces of the laser rod to disrupt and scatter the barrel modes. The new approach described herein functions with an optical polish on the side surfaces of the laser rod and instead sweeps the barrel mode light to the one of the ends of the laser rod, where it is ejected.

Trapped by total-internal-reflection (TIR), light can swirl around the inside of the laser rod and travel over long path lengths before reaching the end of the rod. The result of these long trapped ASE paths is that the gain present in the outer portion of the laser rod can be effectively depleted. If $n_r$ is the refractive index of the laser rod and ns is the refractive index of the material surrounding the laser rod, then it can be shown that the annular portion of the rod swept out by these swirling rays is given by $(n_s/n_r) r_{rod} < r < r_{rod}$. This means that if the gain depletion is severe, then only that portion of the rod lying inside a circular area with radius $(n_s/n_r)r_{rod}$ is useful for extracting laser energy from the rod. FIG. 2 illustrates the useful laser energy extraction area 20 and the unusable area 22.

As an example, consider a YAG rod surrounded by water for cooling, where $n_r=1.82$ and $n_s=1.33$. In this case, if the swirling rays cause severe gain depletion, then only that portion of the rod contained within the central 53% (=100 $(1.33/1.82)^2$) of the rod's cross sectional area would be useful for contributing to laser output power.

One technique that has recently been developed and demonstrated, the flanged end-capped laser rod See U.S. Pat. No. 5,936,984, "Laser Rods With Undoped, Flanged End-Caps," by Helmuth Meissner et al., incorporated herein by reference), has proven useful in limiting the maximum length of the ray path that can be trapped in the laser rod. In the case of the straight barrel polished laser rod shown in FIG. 1 above, if the swirling rays of light wander to the end of the laser rod and then strike the end face of the rod at a high angle, they will be completely trapped by total internal reflection at that end face. In such a situation, the rays will be simply turned around and sent swirling down the rod in the other direction until they hit the output face at that end. This process is particularly bad from the viewpoint of depleting the stored laser energy in the rod, as these trapped rays now have an infinitely long trapped path length.

SUMMARY OF THE INVENTION

It is an object of the present invention to provide a technique for reducing the ability of the trapped spontaneous emission to negatively impact laser performance through amplified spontaneous emission (ASE).

It is another object of the invention to provide a tapered laser rod having flanged endcaps to dramatically reduce the maximum trapped path length of barrel modes within the laser rod.

These and other objects of the invention will be apparent to those skilled in the art based on the teachings herein.

A flanged endcap effectively traps the swirling ASE rays, causing them to be scattered out of the laser rod. However, limiting the trapped ray paths to one pass down the length of the laser rod can still allow for very long ray paths to be trapped, causing gain depletion in the laser rod. The present invention limits the maximum ray paths that can be trapped within the laser rod by tapering the laser rod over its length. This tapered design combined with flanged endcaps eliminates deleteriously long trapped path lengths.

Tapering the diameter of the laser rod over its length thus reduces the maximum trapped path length of barrel modes, reducing the ability of the trapped spontaneous emission to negatively impact laser performance through amplified spontaneous emission. In the present invention, a laser rod incorporates both undoped flanged endcaps and a tapered barrel.

In one embodiment, the rod barrel tapers in diameter from a small value of at one end to a larger value at the other end. By introducing a taper on the barrel of the laser rod, swirling rays are prevented from loitering for extended path lengths in the laser rod. This is a significant improvement over the use of the flanged endcaps on a straight barreled rod, as the straight barrel rod configuration still allows trapped paths with infinite length.

Due to the rod's taper, there is a portion of the laser rod's volume that will be inaccessible to an extracting laser beam due to the aperture introduced by the small end of the laser rod. Because this inaccessible volume grows as the taper grows, there will be an optimum taper value.

In another embodiment, the center of the laser rod is the narrowest and the diameter increases towards either end. The advantage of this geometry, with its dual taper, over a rod with a continuous taper from one end to the other, is that the maximum trapped path length in this rod is halved compared to that in the continuously tapered rod.

BRIEF DESCRIPTION OF THE DRAWINGS

FIG. 1 illustrates swirling rays propagating to the end of a barrel laser rod.

FIG. 2 illustrates the useful laser energy extraction area and the unusable area.

FIG. 4 shows a sketch of a laser rod incorporating both undoped flanged endcaps and a tapered barrel.

FIG. 5 illustrates that in the use of the method of images, rays are straight-line propagated through reflective interfaces into image regions that are constructed from the original laser rod through the use of repeated reflections of the gain volume at the TIR surfaces.

DETAILED DESCRIPTION OF THE INVENTION

Figure 3:
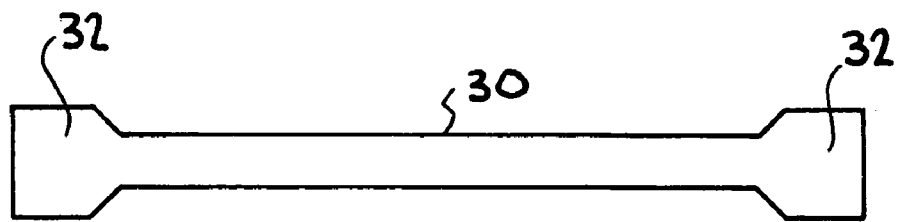
FIG. 3 shows a diagram of a straight barreled laser rod having a flange on each end.

The present inventors have discovered that once the swirling rays shown FIG. 1 reach the end of the barrel laser rod, the placement of a flanged endcap will effectively trap the rays and they will be scattered out of the laser rod. FIG. 3 shows a diagram of a laser rod 30 having a flange 32 on each end. Such configuration has been shown to be effective at limiting the maximum ray paths that can be trapped in the laser rod.

Effectively, the flanged laser rod limits the swirling rays described above to at most one pass down the length of the laser rod. However, even limiting the trapped ray paths to one pass down the length of the laser rod can still allow for very long effective ray paths to be trapped, which in turn can pose a serious problem for gain depletion in the laser rod. These long trapped ray paths are characterized by swirling around many times while only moving a very short transverse distance up or down the laser rod. In fact, it is still possible for infinitely long ray paths to exist, which swirl around the laser rod but do not walk up or down its length.

The present invention limits the maximum ray paths that can be trapped within the laser rod by tapering the laser rod over its length. This tapered design combined with the use of the flanged endcaps described above results in the elimination of the possibility of infinitely long trapped path lengths.

Tapering the diameter of the laser rod over its length dramatically reduces the maximum trapped path length of a barrel mode, thereby reducing the ability of the trapped spontaneous emission to negatively impact laser performance through amplified spontaneous emission (ASE). FIG. 4 shows a sketch of a laser rod incorporating both undoped flanged endcaps and a tapered barrel, which is the subject of the presently disclosed invention.

In FIG. 4, the rod barrel 40 tapers in diameter from a small value of d at one end to a larger value of d+$\epsilon$ at the other end 44. The impact of introducing a taper on the barrel of the laser rod is that it prevents swirling rays from loitering for extended path lengths in the laser rod. This is a significant improvement over the use of the flanged endcaps on a straight barreled rod, as the straight barrel rod configuration still allows trapped paths with infinite length. To estimate the maximum path lengths that can be trapped by a tapered laser rod with endcaps, a simple "method of images" technique can be invoked that greatly simplifies the calculation. The reason for using the method of images trick is that it simplifies the calculation of ray paths that involve TIR. Using the method of images, rather than having to calculate reflected angles and multiple bounce paths, rays are just straight-line propagated through reflective interfaces into image regions that are constructed from the original laser rod through the use of repeated reflections of the gain volume at the TIR surfaces. Of course, using this method does require that the constructed image space be continuous in the sense of not containing any internal gaps. Unfortunately, round cross-sectioned rods do not meet the requirement of continuously filling a region of space on reflection about their various TIR surfaces. One simple approximation that allows the method of images to be applied to round rods models them as having a hexagonal cross-section. Under this approximation, a rod with a taper generates a spherical shell with thickness equal to the length of the rod.

In FIG. 5, the longest path length that is trapped in the laser rod is then the length of the longest line that can be drawn between any two points on the surface of the sphere. In the figure, a ray which intersects the surface of the sphere corresponds to a trapped ray which has wandered into the flanged endcap at the rod end with the largest diameter. With the help of FIG. 5, the longest trapped ray path is seen to correspond to a line that is tangent to the surface of the inner sphere. A simple calculation for the presently considered rod, with its diameter tapering from d at one end to d+$\epsilon$ at the other, then gives the length of this longest trapped path length as $2 \cdot l \cdot SQR(1+2 \cdot d/\epsilon)$, where $l$ is the length of the laser rod over which the taper occurs. Considering this expression for the longest trapped ray length, the question that naturally arises is what is the optimum value for the taper parameter $\epsilon$. Clearly, if $\epsilon$ approaches 0, then the maximum path length can be pushed to infinity as has already been discussed for a straight rod. On the other hand, if $\epsilon$ is made too large, then the useful mode volume of the rod is decreased. This last point is illustrated with the help of FIG. 6 as discussed below.

Figure 6:
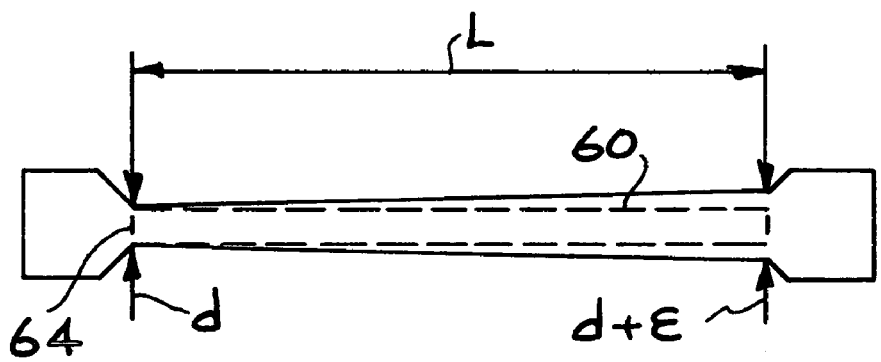
FIG. 6 shows the central area of the rod that can be extracted with a laser beam in a conventional resonator.
Figure 8:
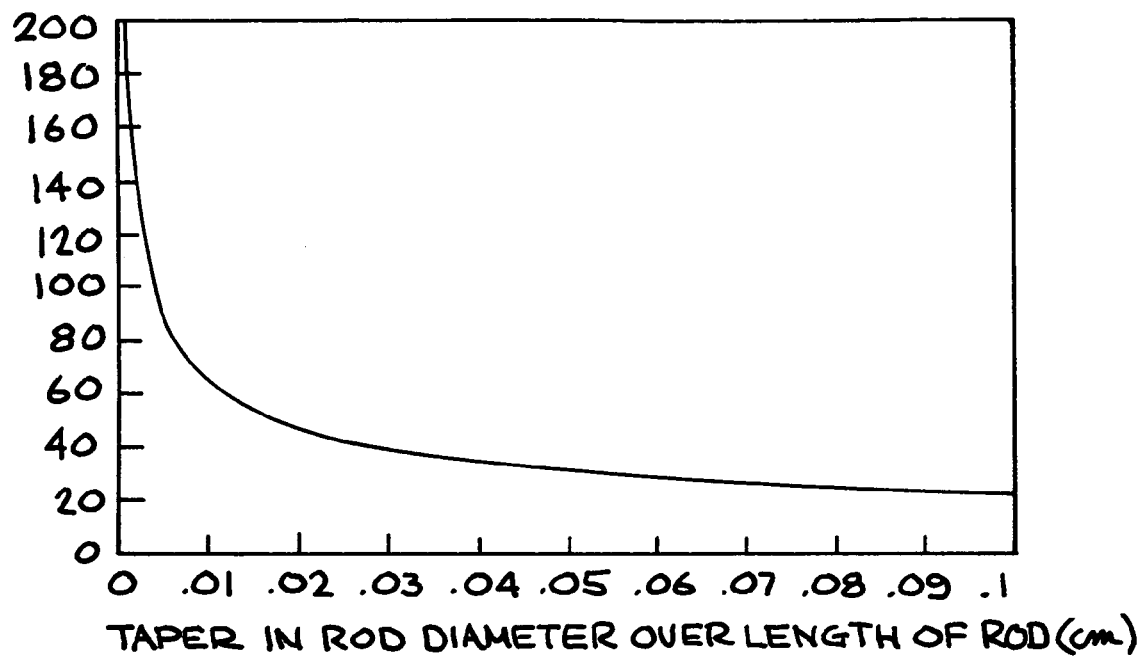
FIG. 8 shows the maximum trapped ASE path length versus taper in rod diameter over the rod length.
Figure 9:
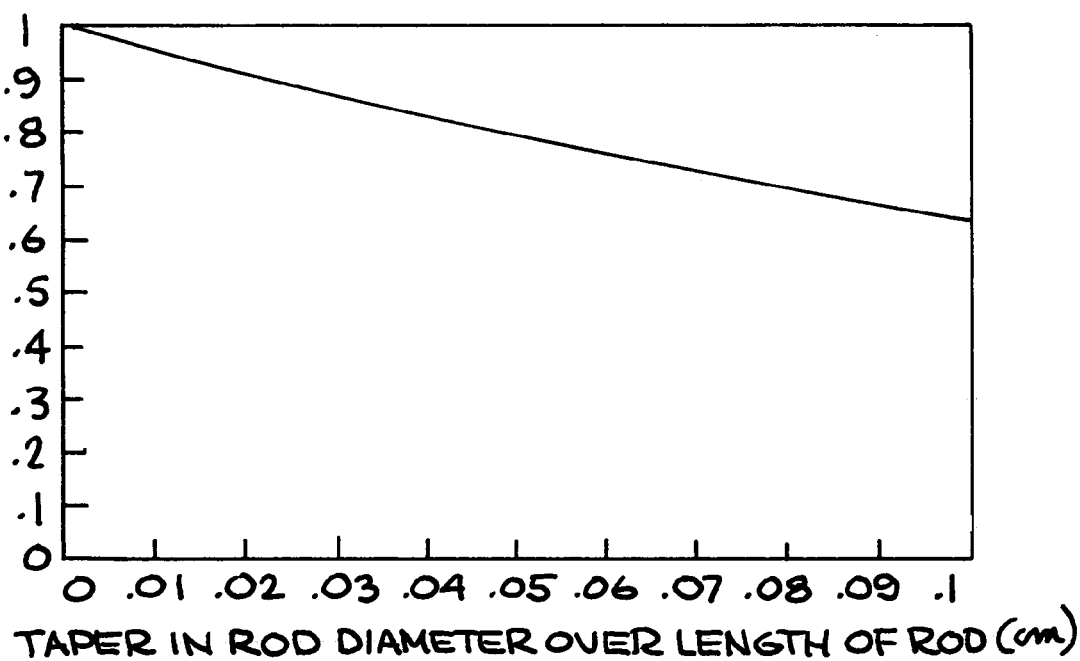
FIG. 9 shows the fractional volume of the rod that is extractable versus taper in rod diameter over the rod length.

In FIG. 6, the central area 60 corresponds to that portion of the rod 62 that can be extracted with a laser beam in a conventional resonator. Due to the rod's taper, there is a portion of the laser rod's volume that will be inaccessible to an extracting laser beam due to the aperture introduced by the small end 64 of the laser rod. Because this inaccessible volume grows as the taper grows, there will be an optimum taper value, $\epsilon$, that best balances the contradictory requirements of maximizing the size of the taper so as to minimize the longest trapped path length, and minimizing the size of the taper so as to maximize the fractional volume in the rod that is accessible to the extracting laser beam. FIGS. 8 and 9 show these two quantities plotted against the taper size for a 2 mm diameter by 5 cm long Yb:YAG laser rod.

Figure 7:
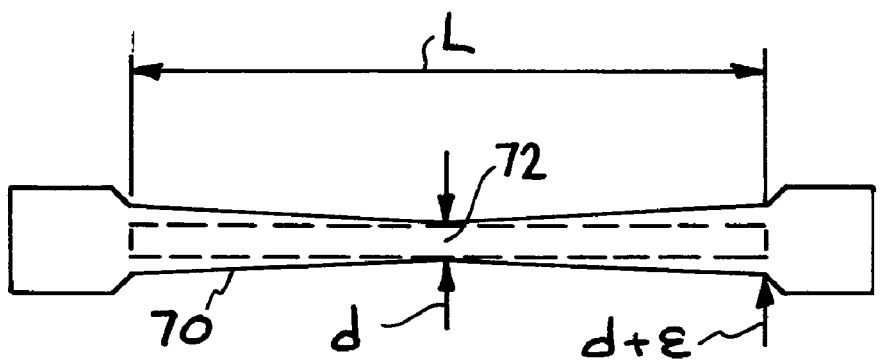
FIG. 7 shows the center of the rod is the narrowest and the diameter increases as you go towards either end.

A variation on the above approach that offers some performance benefit is shown in FIG. 7. Here, rather than having a continuous taper over the entire length of the laser rod 70, the center of the rod 72 is the narrowest and the diameter increases as you go towards either end.

The advantage of this geometry, with its dual taper, over a rod with a continuous taper from one end to the other, is that the maximum trapped path length in this rod is halved compared to that in the continuously tapered rod. Additionally, this halving of the maximum trapped path length comes without a penalty in the fractional volume of the rod from which energy can be extracted, assuming the same value of taper parameter, $\epsilon$, for both types of rods.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
a polished uncoated doped laser rod comprising a first end and a second end, wherein said laser rod comprises a tapered diameter along its entire length, wherein its entire length is doped, wherein said tapered diameter comprises a taper value chosen to manage the contradictory requirements of minimizing barrel modes and maximizing the fractional volume in said laser rod that is accessible to an extracting laser beam, wherein said rod is operatively located in direct contact with a surrounding medium that has a lower index of refraction than said rod;
a first flanged endcap operatively connected to said first end; and
a second flanged endcap operatively connected to said second end.

2. The apparatus of claim 1, wherein said laser rod comprises a maximum diameter at said first end and a minimum diameter at said second end.

3. The apparatus of claim 1, wherein said laser rod comprises a maximum diameter at said second end and a minimum diameter at said first end.

4. The apparatus of claim 1, wherein said laser rod comprises a minimum diameter at about half the distance from said first end to said second end.

5. The apparatus of claim 1, wherein said first flanged endcap and said second flanged endcap are undoped.

6. The apparatus of claim 1, wherein said laser rod tapers in diameter from a small value of d at one end to a larger value of d+ϵ at the other end.

7. The apparatus of claim 1, wherein said said taper value is optimized to balance the contradictory requirements of maximizing the size of said taper to minimize the longest trapped path length of light rays propagating within said laser rod, and minimizing the size of said taper so as to maximize the fractional volume in said laser rod that is accessible to an extracting laser beam.

8. The apparatus of claim 1, wherein said tapered diameter continuously changes over the entire length of said laser rod.

9. The apparatus of claim 1, wherein said laser rod is narrowest between the ends of said laser rod and the diameter increases at each end.

10. The apparatus of claim 1, wherein said laser rod is narrowest at about half the distance between the ends of said laser rod and the diameter increases towards either end.

11. The apparatus of claim 10, wherein said is optimized to balance the contradictory requirements of maximizing the size of said taper to minimize the longest trapped path length of light rays propagating within said laser rod, and minimizing the size of said taper so as to maximize the fractional volume in said laser rod that is accessible to an extracting laser beam.

12. A solid state laser, comprising:
a uncoated doped laser rod with a first end and a second end and an wherein said laser rod comprises a tapered diameter along its entire length, wherein its entire length is doped, wherein said tapered diameter comprises a taper value chosen to manage the contradictory requirements of minimizing barrel modes and maximizing the fractional volume in said laser rod that is accessible to an extracting laser beam, wherein said rod is operatively located in direct contact with a surrounding medium that has a lower index of refraction than said rod;
a first flanged, undoped end-cap optically contacted to said first end portion to form a first interface;
a second flanged, undoped end-cap optically contacted to said second end to form a second interface;
a cooling jacket sealably coupled to said first and second flanged end-caps;
a pump laser for providing pump laser light directed at said first flanged end-cap; and
a lens duct interposed between said pump laser and said first flanged end-cap, wherein said lens duct will concentrate said pump laser light.

13. The solid state laser of claim 12, wherein said laser rod has a host lattice, and wherein said host lattice and said first and second flanged end-caps are selected from the group consisting of yttrium aluminum garnet, gadolinium gallium garnet, gadolinium scandium gallium garnet, lithium yttrium fluoride, yttrium vanadate, phosphate glass and sapphire.

14. The solid state laser of claim 13, wherein said host lattice is doped with a material selected from the group consisting of Ti, Cu, Co, Ni, Cr, Ce, Pr, Nd, Sm, Eu, Gd, Th, Dy, Ho, Er, Tm and Yb.

15. The solid state laser of claim 12, wherein said laser rod comprises $Yb^{3+}$ doped YAG, and wherein said pump laser is an InGaAs diode laser array.

16. A method for fabricating a laser rod, comprising:
providing a polished uncoated doped laser rod comprising a first end and a second end;
operatively locating said rod in direct contact with a surrounding medium that has a lower index of refraction than said rod;
operatively connecting a first flanged endcap to said first end;
operatively connecting a second flanged endcap to said second end; and
tapering the diameter of said laser rod along its entire length, wherein the entire length of said laser rod is doped, wherein said laser rod comprises a taper value chosen to manage the contradictory requirements of minimizing barrel modes and maximizing the fractional volume in said laser rod that is accessible to an extracting laser beam.

17. The method of claim 16, wherein the step of tapering the diameter of said laser rod comprises forming a maximum diameter at said first end and a minimum diameter at said second end.

18. The method of claim 16, wherein the step of tapering the diameter of said laser rod comprises forming a maximum diameter at said second end and a minimum diameter at said first end.

19. The method of claim 16, the step of tapering the diameter of said laser rod comprises forming a minimum diameter at about half the distance from said first end to said second end.

20. The method of claim 16, further comprising optimizing said taper value to balance the contradictory requirements of maximizing the size of said taper value so as to minimize the longest trapped path length of light rays propagating within said laser rod, and minimizing the size of said taper value to maximize the fractional volume in said laser rod that is accessible to an extracting laser beam.

* * * * *